US012598687B2

(12) United States Patent
Secretin

(10) Patent No.: US 12,598,687 B2
(45) Date of Patent: Apr. 7, 2026

(54) METHOD FOR CONFIGURING A LUMINAIRE SYSTEM AND DEVICE FOR USE THEREIN

(71) Applicant: Schreder S.A, Brussels (BE)

(72) Inventor: Laurent Secretin, Liege (BE)

(73) Assignee: Schreder S.A., Brussels (BE)

( * ) Notice: Subject to any disclaimer, the term of this patent is extended or adjusted under 35 U.S.C. 154(b) by 270 days.

(21) Appl. No.: 18/551,574

(22) PCT Filed: Mar. 22, 2022

(86) PCT No.: PCT/EP2022/057538

§ 371 (c)(1),
(2) Date: Sep. 20, 2023

(87) PCT Pub. No.: WO2022/200378

PCT Pub. Date: Sep. 29, 2022

(65) Prior Publication Data

US 2024/0179820 A1 May 30, 2024

(30) Foreign Application Priority Data

Mar. 22, 2021 (NL) ...................................... 2027792

(51) Int. Cl.
*H05B 47/18* (2020.01)
*H05B 47/14* (2020.01)
*H05B 47/175* (2020.01)

(52) U.S. Cl.
CPC ........... *H05B 47/183* (2024.01); *H05B 47/14* (2020.01); *H05B 47/175* (2020.01)

(58) Field of Classification Search
CPC ..... H05B 47/183; H05B 47/14; H05B 47/175
See application file for complete search history.

(56) References Cited

U.S. PATENT DOCUMENTS 10,470,279 B1 * 11/2019 Fultz ...................... H05B 45/30
2016/0286628 A1 * 9/2016 Cho ..................... H05B 47/183
(Continued)

FOREIGN PATENT DOCUMENTS

AU 2019233734 A1 10/2020
WO 2014154274 A1 10/2014
WO 2017151682 A1 9/2017

OTHER PUBLICATIONS

PCT International Search Report and Written Opinion, Application No. PCT/EP2022/057538, mailed Jun. 30, 2022, 14 pages.

*Primary Examiner* — Daniel D Chang
(74) *Attorney, Agent, or Firm* — McDonnell Boehnen Hulbert & Berghoff LLP

(57) ABSTRACT

A method for configuring a luminaire system comprising a first device and a second device, and a control line between said first device and said second device, wherein said second device is configurable to send and/or receive signals through the control line to/from the first device using any one of a plurality of different protocols, and wherein said first device is configured to use one of the plurality of different protocols, the method comprising: measuring at least one value representative for an impedance of the first device as seen from the control line, such as a voltage and/or current at the control line; based on the at least one measured value, selecting a corresponding protocol of said plurality of protocols; and configuring the second device to use the selected corresponding protocol.

20 Claims, 7 Drawing Sheets

(56) References Cited

U.S. PATENT DOCUMENTS

| | | | | |
|---|---|---|---|---|
| 2017/0295624 | A1 | 10/2017 | Lark, Jr. et al. | |
| 2020/0205254 | A1 * | 6/2020 | Fultz | H05B 45/10 |

* cited by examiner

METHOD FOR CONFIGURING A LUMINAIRE SYSTEM AND DEVICE FOR USE THEREIN

CROSS-REFERENCE TO RELATED APPLICATIONS

The present application is a national stage entry of PCT/EP2022/057538 filed Mar. 22, 2023, which claims priority to NL 2027792 filed Mar. 22, 2022, the contents of each of which are hereby incorporated by reference.

FIELD OF INVENTION

The present invention relates to the field of configuring luminaire systems, and in particular to a method for configuring a luminaire system comprising a first device and a second device, and a control line between said first device and said second device, wherein said second device is configurable to send and/or receive signals through the control line to/from the first device using any one of a plurality of different protocols. The invention also relates to a device for use in such method and to a luminaire system comprising such device.

BACKGROUND

Luminaire systems comprise typically a luminaire housing in which at least one light source is arranged, the light source being driven by a driver receiving power from the mains. Additionally, a controller is provided for controlling the light emitted by the light source and/or for controlling beyond-lighting devices. Typically the controller is connected to the driver. The controller may be provided in the luminaire housing. Alternatively, the controller may be provided outside of the luminaire housing, e.g. as a pluggable control module which can be plugged in a socket receptacle which is connected to the driver. Such socket receptacle may be provided e.g. on top of the luminaire housing or on a surface of the luminaire housing facing the ground. Sometimes, the controller may be integrated with the driver.

The controller receives power from the mains, either directly from the mains or from a power conversion means (e.g. included in the driver) connected to the mains, and exchanges data with the driver and/or other components of the luminaire system. The controller may be configured for performing controlling and/or sensing and/or processing and/or wireless communications. For example, the controller may be a pluggable control module with a processor and a photosensor for sensing ambient light.

Luminaire networks in urban or industrial environments may contain large numbers of luminaires. Upon installation or replacement or repair of a luminaire system or when a new device is added to the luminaire system, a device of the luminaire system may have to be configured to be able to communicate with another device of the luminaire system or with the new device.

An example of a component that may need to be configured is a controller. For example, the controller may need to be configured to use the right dimming protocol to communicate with a driver of the light source. Typically the driver is able to communicate through the control line with only one protocol or a limited number of protocols. Furthermore, from the outside appearance of the luminaire system, it is typically not derivable what kind of driver is provided. In such case, it is desirable that the controller can be configured automatically without the need for knowing the technical details of the driver. Also, when another device such as a sensor is connected to the controller, it may be desirable that the controller is configured automatically for communicating with the sensor without knowing the technical details of the sensor. In some cases the driver may be capable of communicating with other devices using different kind of protocols, and then it may be desirable to be able to configure the driver to use a particular protocol depending on the type of device connected to the driver.

Moreover, when the device to be configured is provided with or connected to a communication means to connect the luminaire system to a network, the configuring of the device can then be done remotely.

SUMMARY

The object of embodiments of the invention is to provide an improved method for configuring a luminaire system, in particular during installation or replacement or repair or when a new device is added to the luminaire system.

According to a first aspect of the invention, there is provided a method for configuring a luminaire system comprising a first device, a second device, and a control line between said first device and said second device. The second device is configurable to send and/or receive signals through the control line to/from the first device using any one of a plurality of different protocols. The first device is configured to use one of the plurality of different protocols. The method comprises the following steps, preferably controlled by the second device:

a) determining at least one value representative for a characteristic of the first device as seen from the control line, preferably measuring at least one value representative for an impedance of the first device as seen from the control line, such as a voltage and/or current at the control line;
b) based on the determined/measured at least one value, selecting a corresponding protocol of said plurality of protocols; and configuring the second device to use the selected corresponding protocol.

Embodiments of the invention are based inter alia on the inventive insight that the impedance of the first device as seen from the control line may be used to determine the protocol that is being used by the first device for communicating over the control line. Indeed, the inventors have realized that different protocols can be associated with different impedances, and by measuring at least one value representative for the impedance, it can be determined which protocol is being used by the first device. Thus, based on the at least one measured value, the protocol of the first device may be selected amongst the plurality of protocols, and the second device can be configured to use the selected protocol to communicate with the first device. In that manner, when the first device is installed for the first time and/or when the second device is installed for the first time, or when the first and/or second device is replaced, the second device may be configured or reconfigured automatically without the need for knowing the protocol used by the first device.

Instead of measuring a value representative for the impedance, also one or more other characteristics may be determined or measured.

The protocol is typically a communication protocol, i.e. a set of rules that allows the first device and the second device to transmit information via any kind of variation of a physical quantity. The protocol defines the rules, syntax, semantics and synchronization of communication and possible error recovery methods. Protocols may be implemented by hardware, software, or a combination of both.

According to an exemplary embodiment, the determining comprises listening for an electric signal on the control line and determining at least one value for a characteristic of that signal.

Also, alternatively to the listening or in addition to the listening, step a) may comprise emitting a test signal according to a first protocol of said plurality of protocols, and determining a value of a response signal on the control line, and if the value is according to the first protocol, selecting the first protocol in step b), and if the response is not according to the first protocol, selecting another protocol in step b) and/or emitting a further test signal according to a second protocol of said plurality of protocols, and determining a value of a response signal on the control line.

In a more detailed exemplary embodiment, the second device is first listening for an electrical signal, such as a voltage signal, and it is determined if the electric signal is a unipolar or bipolar signal. Based on this determination, a protocol or a set of protocols of the plurality of protocols is selected. Optionally, when a set of possible protocols is remaining, a further characteristic of the electric signal, such as a frequency or a baud rate of the electric signal is detected, and based on the detected value of the characteristic the corresponding protocol is selected. Optionally, if, when listening, the second device does not detect any signal, the second device may send a test or probing signal, and operate in accordance with the steps described in the previous paragraph. Such embodiments may be used for example to distinguish between different communication protocols, such as the Serial Peripheral Interface (SPI) protocol, Inter-Integrated Circuit ($I_2C$) protocol, and a Digital Addressable Lighting Interface DALI protocol, e.g. DALI-2 or D4i.

In an exemplary embodiment, the second device is configured to switch between a listening mode and a steering mode, said listening mode being a mode in which the impedance of the second device as seen from the control line allows performing the measuring of step a) and said steering mode being such that signals in accordance with the selected protocol can be exchanged (sent and/or received) between the second device and the first device, and preferably sent from the second device to the first device, and wherein the second device is put in the listening mode for performing step a) and put in the steering mode after step a). By providing a listening mode an accurate measurement can be performed. Typically, the switching between the listening and the steering mode may be automatically performed by the second device, and preferably the second device is programmed to enter automatically in the listening mode when the device is powered-on and a value such as a flag stored in a memory space of the second device indicates that the protocol still has to be selected, see further. Alternatively, the selecting of the listening mode or the steering mode may be done on request, e.g. through a button or on request of a mobile or remote device.

In an exemplary embodiment, the first device is a driver configured for driving a load of the luminaire system, such as a light source, and the second device is a controller configured for controlling the driver. For example, the light source may comprise a plurality of LEDs and the driver may be a LED driver. However, also other loads are possible, such as a sensing means, a communication device, an output means such as a display or a loudspeaker, an input means, a dispensing means, a human-interface device.

When multiple loads are present, it is also possible to have multiple control lines between the driver and the controller for controlling the driving of the multiple loads. In such an embodiment the protocol to be used on one or more of said multiple control lines may be determined for each of said one or more control lines using steps a) and b) as described above.

In an exemplary embodiment, where the luminaire system comprises a light source to be dimmed, the plurality of protocols may comprise a plurality of different dimming protocols.

In many luminaire systems, the LED driver is designed to use a specific dimming protocol, whilst a controller is configurable with different dimming protocols. Using embodiment of the method, the controller can be configured to use the specific dimming protocol of the driver in an automatic manner. Here the driver is the first device and the controller the second device.

However, in some luminaire systems, the LED driver is designed to use different dimming protocols whilst the controller is configured to use a specific dimming protocol. Also in such systems, an embodiment of the method may be used to configure the driver. Here the driver is the second device and the controller is the first device.

Preferably, the plurality of dimming protocols comprises an analogue dimming protocol, such as 0-10V or 1-10V, and a digital dimming protocol such as Digital Addressable Lighting Interface DALI protocol, e.g. DALI-2 or D4i, or a digital multiplex interface DMX protocol.

In an exemplary embodiment, the first device is a sensor and the second device is a controller. For example, the sensor may be an environmental sensor such as a light sensor, a motion sensor, a pollution sensor, an image sensor such as a camera, a radar sensor, a microphone, a visibility sensor, a vibration sensor, an air flow sensor, a detector of $CO_2$, $NO_x$, smoke, etc.

For example, the sensor may be a light sensor, e.g. a light sensor used in tunnels. Such sensors may communicate with the controller using a 4-20 mA protocol or another protocol, e.g. DALI or 0-10V. In such an embodiment, the current on the control line may be measured to determine whether the protocol is a 4-20 mA protocol. For example, if the measured current is above 4 mA, it may be determined that the protocol is the 4-20 mA protocol and if the measured current is below 4 mA, it may be determined that another protocol is used. In some embodiments, a further comparison may be used to distinguish between further possible protocols. Optionally, also a voltage measurement may be performed to distinguish between further possible protocols.

In another example, the sensor may be a camera. A camera may communicate e.g. via a power over Ethernet PoE protocol or through DALI. In such an embodiment, the voltage on the control line may be measured to determine whether the protocol is a PoE protocol or a DALI protocol. For example, if the measured voltage is between 16V and 24V, it may be determined that the protocol is the DALI protocol and if the measured voltage is between 42V and 56V, it may be determined that the protocol is a PoE protocol.

In another exemplary embodiment, the first device is a human-interface device and the second device is a controller. The human interface device (HID) may be e.g. a button, such as a panic button, a touch screen, a microphone.

In an exemplary embodiment, the second device is a driver configured for driving a load of the luminaire system. The first device may then be a controller, as explained above, but the first device may also be another device, e.g. the load or another device that is communicating with the driver.

The first device may be e.g. a sensor, a communication device, an output means such as a display or a loudspeaker, an input means, a dispensing means, a human-interface device. The sensor may be any one of the sensors listed above. The human interface device (HID) may be any one of the devices listed above.

In an exemplary embodiment, step a) comprises applying a current and measuring a voltage and/or applying a voltage and measuring a current.

In an embodiment where a voltage is measured e.g. on the control line, preferably the listening mode is such that the impedance of the second device as seen from the control line is a high impedance, e.g. an impedance which is higher than 10 MΩ, preferably higher than 100 MΩ. In an embodiment where a current is measured e.g. through the control line, preferably the listening mode is such that the impedance of the second device as seen from the control line is a low impedance, e.g. an impedance lower than 1 kΩ, more preferably lower than 100Ω.

In an exemplary embodiment, the step of measuring at least one value comprises measuring a voltage on the control line.

Preferably, the plurality of protocols comprises at least a first protocol associated with a first voltage range and a second protocol associated with a second voltage range, and the selecting is done by comparing the measured voltage with said first and second range.

For example, in an embodiment where the plurality of protocols comprise a plurality of dimming protocols, step b) may comprise, if the measured voltage is above a predetermined second threshold, setting an analogue dimming protocol; and if the measured voltage is below a predetermined first threshold, setting a DALI dimming protocol, wherein the second threshold is higher than or equal to the first threshold.

In this example it is assumed that the second device can control the provision of power of the control line, an more in particular that the second device can be put in a mode where a high impedance is seen from the control line looking into the second device. In such an embodiment, the second device may have an internal power supply which can be switched on/off by the second device.

In another example, step b) may comprise, if the measured voltage is above a predetermined first threshold and below a predetermined second threshold, wherein the second threshold is higher than the first threshold, setting an analogue dimming protocol; if the measured voltage is above the second threshold or below the first threshold, setting a DALI protocol, wherein optionally, if the measured voltage is below the first threshold, the second device connects the control line to an internal power supply so that the control line is powered.

This embodiment will be suitable both for cases where an external power supply is used to power the control line as well as for cases where an internal power supply controlled by the second device is used. Stated differently, the method may be used for cases where it is unknown whether or not an external power supply is used.

In a preferred embodiment, the second device comprises measurement circuitry for performing step a). For example, when the second device is a controller such measurement circuitry may already be present as it may be the same measurement circuitry that is being used for measuring the power consumed by the luminaire system or by one or more components of the luminaire system.

In an exemplary embodiment, step a) is performed after a predetermined delay time has passed after switching on the first device.

According to another aspect there is provided a device of a luminaire system intended for being connected to at least an other device via a control line. The device is configurable to send and/or receive signals through said control line to/from the other device using any one of a plurality of different protocols. The other device is configured to use one of the plurality of different protocols.

The device is configured to control the following steps:

a) determining at least one value representative for a characteristic of the other device as seen from the control line, preferably measuring at least one value representative for an impedance of the other device as seen from the control line, such as a voltage and/or current at the control line;

b) based on the at least one measured value, selecting a corresponding protocol of said plurality of protocols; and configuring the device to use the selected corresponding protocol.

The technical advantages set out above for embodiments of the method apply mutatis mutandis for embodiments of the device.

In an exemplary embodiment the device is configured for listening for an electric signal on the control line and for determining at least one value for a characteristic of said electric signal.

In an exemplary embodiment, step a) comprises emitting a test signal according to a first protocol of said plurality of protocols, and determining a value of a response signal on the control line, and if the value is according to the first protocol, selecting the first protocol in step b), and if the response is not according to the first protocol, selecting another protocol in step b) and/or emitting a further test signal according to a second protocol of said plurality of protocols, and determining a value of a response signal on the control line.

In a more detailed exemplary embodiment, the device is configured to first listen for an electrical signal, such as a voltage signal, and to determine if the electric signal is a unipolar or bipolar signal, and to select, based on this determination, a protocol or a set of protocols of the plurality of protocols. Optionally, when a set of possible protocols is remaining, the device may be further configured to detect a characteristic of the electric signal, such as a frequency or a baud rate of the electric signal, and based on the detected value of the characteristic, to select the corresponding protocol. Optionally, if, when listening, the device does not detect any signal, the device may be configured to send a probing signal, and to operate in accordance with the steps described in the previous paragraph. Such embodiments may be used for example to distinguish between different communication protocols, such as the Serial Peripheral Interface (SPI) protocol, Inter-Integrated Circuit (I2C) protocol, and Digital Addressable Lighting Interface DALI protocol, e.g. DALI-2 or D4i.

In an exemplary embodiment, the device comprises switching circuitry configured to switch the device between a listening mode and a steering mode, said listening mode being a mode in which the impedance of the device as seen from the control line allows performing the measuring of step a) and said steering mode being such that signals in accordance with the selected protocol can be exchanged between the device and the other device, and wherein the device is configured to put itself in the listening mode for performing step a) and to put itself in the steering mode after step a). For example, the device may be configured to perform the switching between the listening and the steering mode automatically, wherein preferably the device is programmed to enter automatically in the listening mode when the device is powered-on, optionally under the condition that a value, such as a flag stored in a memory space of the second device, indicates that the protocol still has to be selected.

If the measuring comprises measuring a voltage, the listening mode may be such that the impedance of the device as seen from the control line is a high impedance, e.g. an impedance which is higher than 10 MΩ, preferably higher than 100 MΩ. If the measuring comprises measuring a current, the listening mode may be such that the impedance of the device as seen from the control line is a low impedance, e.g. an impedance lower than 1Ω, more preferably lower than 100Ω. If both a voltage and a current are measured in step a), two different listening modes may be provided, i.e. a high impedance mode for measuring the voltage and a low impedance mode for measuring the current.

In an exemplary embodiment, the device is a controller configured for being connected through the control line to a driver and for controlling the driver. The driver may be a driver configured for driving a light source and/or any other load.

When a light source of the luminaire system needs to be dimmed, preferably, the plurality of protocols comprises a plurality of different dimming protocols. For example, the plurality of protocols may comprise an analogue dimming protocol and a digital dimming protocol, such as a Digital Addressable Lighting Interface DALI protocol, e.g. DALI-2 or D4i; or a digital multiplex interface DMX protocol.

In many luminaire systems, the LED driver is designed to use a specific dimming protocol, whilst a controller is configurable with different dimming protocols. The device may then correspond with the controller and it will be the controller that is configured to control the performing of steps a) and b).

However, in some luminaire systems, the LED driver is designed to use different dimming protocols whilst the controller is configured to use a specific dimming protocol. Also in such systems, an embodiment of the device may be used. Indeed, here the device may be the driver which is then configured to control the performing of steps a) and b).

In an exemplary embodiment, the device is a controller configured for communicating with a sensor through the control line.

In an exemplary embodiment, the device is a driver configured for driving a load of the luminaire system. The load may be a light source as explained above, but also other loads are possible, such as a sensing means, a communication device, an output means such as a display or a loudspeaker, an input means, a dispensing means, a human-interface device.

When multiple loads are present, it is also possible to have multiple control lines between the driver and the controller for controlling the driving of the multiple loads. In such an embodiment the protocol to be used on one or more of said multiple control lines may be determined for each of said one or more control lines using steps a) and b) as described above.

In an exemplary embodiment, the device comprises circuitry configured for applying a current and measuring a voltage and/or for applying a voltage and measuring a current.

Preferably, the circuitry is configured for measuring a voltage on the control line. The plurality of protocols may then comprise at least a first protocol associated with a first voltage range and a second protocol associated with a second voltage range, and the selecting is done by comparing the measured voltage with said first and second range.

For example, when the device is connected over a dimming control line to the other device, the device may be configured for setting an analogue dimming protocol if the measured voltage is above a predetermined second threshold; and for setting a DALI dimming protocol if the measured voltage is below a predetermined first threshold, wherein the second threshold is higher than or equal to the first threshold.

In another example, step b) comprises, if the measured voltage is above a predetermined first threshold and below a predetermined second threshold, wherein the second threshold is higher than the first threshold, setting an analogue dimming protocol; if the measured voltage is above the second threshold or below the first threshold, setting a DALI protocol, wherein optionally, if the measured voltage is below the first threshold, the second device connects the control line to an internal power supply so that the control line is powered.

In exemplary embodiments of the method or the device, step b) may involve determining whether the measured at least one value fulfills a predetermined criterion. For example, step b) may involve determining whether the at least one value falls within a range and/or comparing the at least one value with a threshold value.

In an exemplary embodiment of the method or the device, the step of measuring at least one value comprises measuring multiple values, and step b) comprises determining differences between the multiple values, and performing the step of selecting based on the determined differences.

For example, the second device may be capable of using a digital protocol such as DALI and an analog protocol such as 0-10V whilst the first device is capable of using only a single one of said protocols. In such an embodiment, the first device could send signals on the control line using said one protocol which is unknown to the second device. By measuring variations on the control line it may then be determined by the second device whether the digital protocol or the analog protocol is used. Indeed, in case of a digital protocol one will measure a difference between a value representing a “1” and a value representing a “0” whilst in case of an analog protocol different difference variations will be measured, allowing distinguishing between the two protocols.

In an exemplary embodiment of the method or the device, after performing step a), a step of controlling an internal power supply of the second device to power the control line, is performed. Thus, the device may be configured to perform such step.

The powering of the luminaire system may take place in one or more steps. One or more relays may be provided to that end. Embodiments of the method will typically be performed when at least a relevant portion of the second device is powered since the second device has to be capable of performing the controlling of step a) and b). However, as explained above, in preferred embodiment, the second device an internal power supply may be unconnected to the control line for performing step a) and connected to the control line after having performed step a). Typically, also the first device will be powered. However, it will be understood that not all components of the luminaire system need to be powered when performing the method.

In exemplary embodiments, the device or the other device, or the first or the second device referred to in embodiments related to the method, is a controller. In an exemplary embodiment, the controller is a pluggable control module. Preferably, the pluggable control module is configured to be plugged in a socket receptacle, e.g. a socket receptacle provided to a housing accommodating the light source of the luminaire system. More preferably, the socket receptacle is one of a NEMA or Zhaga socket receptacle, and the pluggable control module is a module configured to be plugged in such socket receptacle. For example, the controller may be a NEMA type controller, and the measurement circuitry for measuring at least one value representative for the impedance may be provided in the controller.

According to an exemplary embodiment, the socket receptacle and control module may be implemented as described in PCT publication WO2017/133793 in the name of the applicant, which is included herein by reference. Optionally, the socket receptacle and control module may be configured and/or mounted as described in patent application PCT/EP2020/068854 or PCT/EP2020/060751 or NL 2025472 in the name of the applicant, which are included herein by reference. Further, the controller may be configured as described in any one of the following patent applications in the name of the applicant which are included herein by reference: WO 2020/161356, WO 2021/013925, N2026209. The socket receptacle and the control module may be configured to be coupled through a twist-lock mechanism, e.g. as described in ANSI C136.10-2017 standard or ANSI C136.41-2013 standard or Zhaga Interface Specification Standard (Book 18, Edition 1.0, July 2018, see https://www.zhagastandard.org/data/downloadables/1/0/8/1/book_18.pdf or Book 20:

Smart interface between indoor luminaires and sensing/communication modules), which are included herein by reference.

According to an exemplary embodiment of the method or the device, a memory space of the second device is used to store a value, also called a flag, indicating whether step a) and b) have been performed and/or to store protocol information about the selected protocol, and upon a further powering of the luminaire system, steps a) and b) are only performed if the value indicates that steps a) and b) have not yet been performed.

Such memory space may be reset when performing a factory reset or may be reset remotely to force steps a) and b) to be performed again. E.g. in the event that a central control system receives a problem report of the second device, it may determine to remotely reset the flag to force steps a) and b) to be performed at the next power-on.

According to an exemplary embodiment, after steps a) and b) have been performed, further steps may be performed for testing whether the first and second device are correctly installed. For example an embodiment of a method as described in patent application with application number N2027554 may be performed after steps a) and b). Patent application in the Netherlands with application number N2027554 is included herein by reference.

According to another aspect, there is provided a luminaire system comprising a first device (also called the other device above), a second device corresponding with any one of the embodiments of the device disclosed above, and a control line connecting the first device to the second device. The second device is configurable to send and/or receive signals through said control line to/from the first device using any one of a plurality of different protocols, and the first device is configured to use one of the plurality of different protocols.

The technical advantages set out above for embodiments of the method apply mutatis mutandis for embodiments of the luminaire system.

Preferred embodiments relate to an outdoor luminaire system. By outdoor luminaire system, it is meant luminaires which are installed on roads, tunnels, industrial plants, stadiums, airports, harbors, rail stations, campuses, parks, cycle paths, pedestrian paths or in pedestrian zones, for example, and which can be used notably for the lighting of an outdoor area, such as roads and residential areas in the public domain, private parking areas, access roads to private building infrastructures, warehouses, industry halls, etc.

BRIEF DESCRIPTION OF THE FIGURES

These and other aspects of the present invention will now be described in more detail, with reference to the appended drawings showing preferred embodiments of the invention. Like numbers refer to like features throughout the drawings.

DESCRIPTION OF EMBODIMENTS

Figure 1:
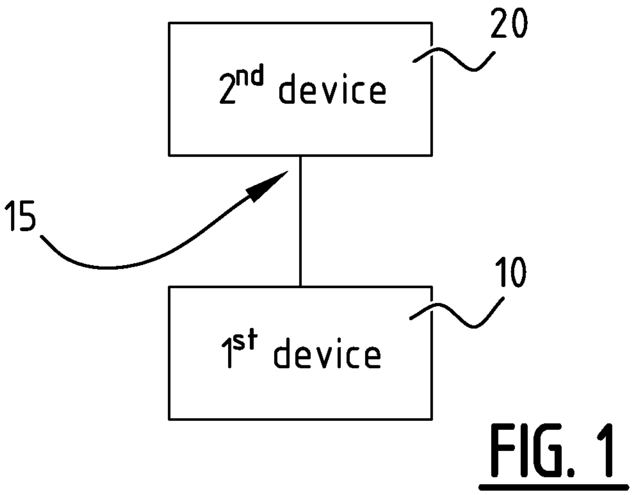
FIG. 1 illustrates a schematic view of an exemplary embodiment of a luminaire system.

FIG. 1 shows a luminaire system comprising a first device 10, a second device 20, and a control line 15 between the first device 10 and the second device 20. The second device 20 is configurable to send and/or receive signals through the control line 15 to/from the first device 10 using any one of a plurality of different protocols. The first device 10 is configured to use one of the plurality of different protocols, and typically it can use only that one protocol and not the other protocols of the plurality of protocols.

In an exemplary embodiment, the first device 10 is a driver configured for driving a load of the luminaire system, such as a light source, a sensing means, a communication device, an output means such as a display or a loudspeaker, an input means, a dispensing means, a human-interface device, and the second device 20 is a controller configured for controlling the driver.

In another exemplary embodiment, the first device 10 is a sensor and the second device 20 is a controller.

In yet another exemplary embodiment, the first device 10 is a human-interface device and the second device 20 is a controller. The human interface device (HID) may be e.g. a button, such as a panic button, a touch screen, a microphone.

In yet another exemplary embodiment, the second device 20 is a driver configured for driving a load of the luminaire system. The first device 10 may then be a controller, but the first device 10 may also be another device, e.g. the load or another device that is communicating with the driver 20. The first device 10 may be e.g. a sensor, a communication device, an output means such as a display or a loudspeaker, an input means, a dispensing means, a human-interface device. The sensor may be any one of the sensors listed above. The human interface device (HID) may be any one of the devices listed above.

Figure 2:
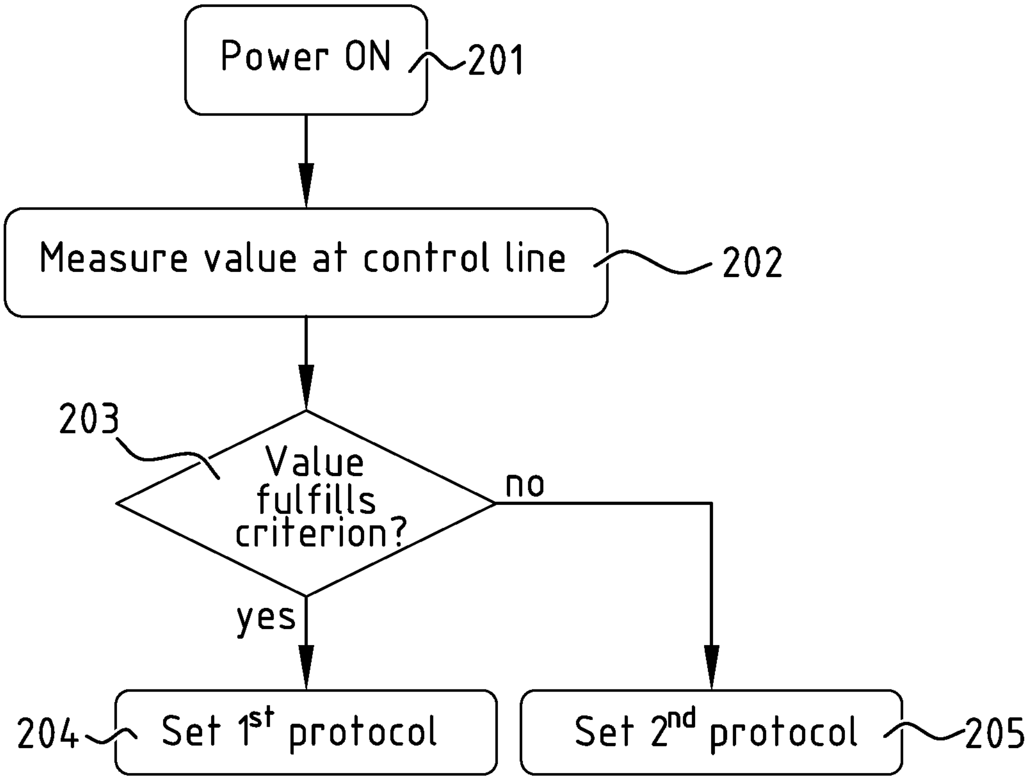
FIG. 2 is a flowchart illustrating an exemplary embodiment of the method.

FIG. 2 illustrates an embodiment of the method which comprises a number of steps controlled by the second device 20. In a first step 201, the first device 10 and the second device 20 are powered on, or relevant portions thereof are powered on. In a second step 202 a value representative for an impedance of the first device as seen from the control line is measured. This may involve measuring multiple values during a predetermined time period in order to measure variations on the control line, e.g. voltage or current variations. Typically, a voltage and/or current are measured. Preferably, this measurement is performed using measurement circuitry in the second device 20. In a third step 203, it is checked, typically by control circuitry in the second device 20, whether the value fulfills a predetermined criterion. If the predetermined criterion is fulfilled, the first protocol is selected and the second device 20 is configured with the first protocol, see step 204 and if not, the second protocol is selected and the second device 20 is configured with the second protocol, see step 205. The criterion may involve comparing the measured value with one or more predetermined threshold values; and/or checking whether the value is within a predetermined range; and/or determining variations based on multiple measured values and comparing said variations with a predetermined threshold and/or checking whether the variations are within a predetermined range, etc.

In the example of FIG. 2, the determining consists in selecting either the first or the second protocol. In more advanced exemplary embodiments, the method may distinguish between more than two different protocols and/or it may be determined that the protocol cannot be determined or that the first device is an unknown device.

Figure 3:
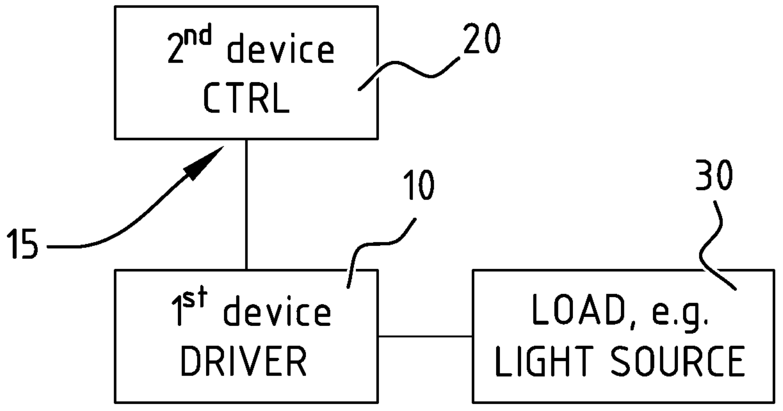
FIG. 3 illustrates a schematic view of an exemplary embodiment of a luminaire system, where the first device is a driver and the second device is a controller.

FIG. 3 illustrates an example where the second device 20 is a controller and the first device 10 is a driver for driving a load 30, e.g. a light source. For example, the light source may comprise a plurality of LEDs and the driver may be a LED driver. However, also other loads 30 are possible, such as a sensing means, a communication device, an output means such as a display or a loudspeaker, an input means, a dispensing means, a human-interface device.

When multiple loads 30 are present, it is also possible to have multiple control lines 15 between the driver 10 and the controller 20 for controlling the driving of the multiple loads 30. In such an embodiment the protocol to be used on one or more of said multiple control lines 15 may be determined for each of said one or more control lines in a similar way as described above using suitable criteria.

In an exemplary embodiment, where the luminaire system comprises a light source 30 to be dimmed, the plurality of protocols may comprise a plurality of different dimming protocols. Preferably, the plurality of dimming protocols comprises an analogue dimming protocol, such as 0-10V or 1-10V, and a digital dimming protocol such as Digital Addressable Lighting Interface DALI protocol, e.g. DALI-2 or D4i, or a digital multiplex interface DMX protocol.

Figure 4:
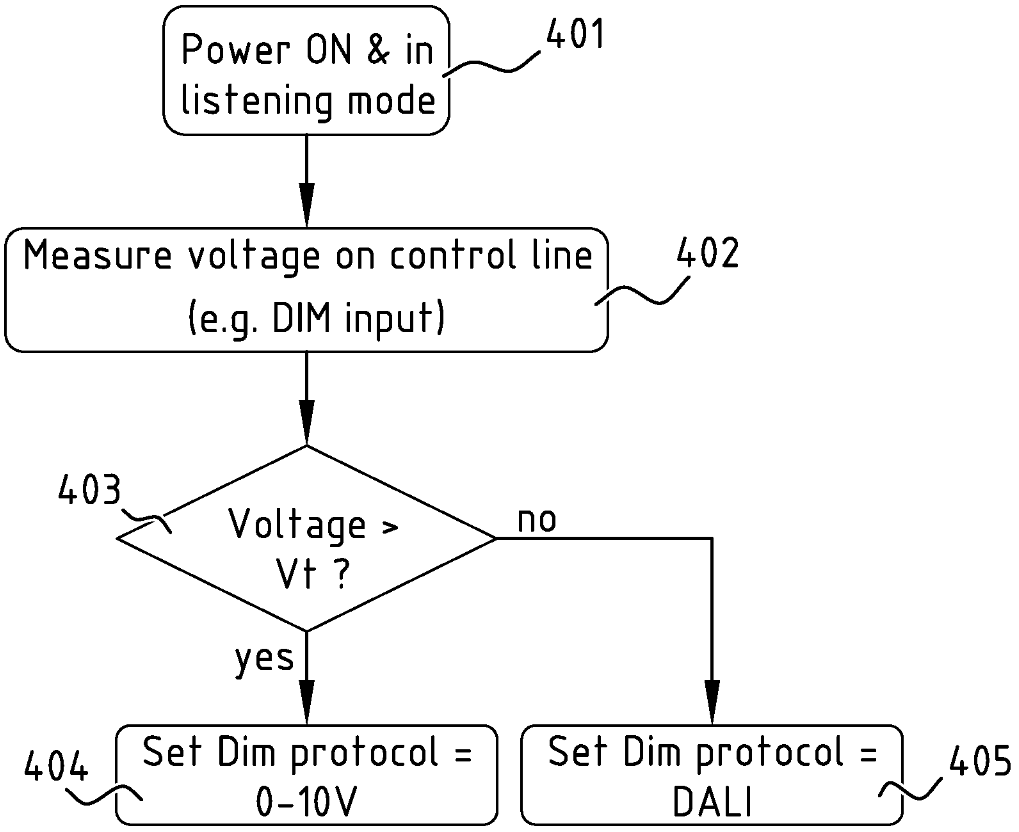
FIG. 4 is a flowchart illustrating an exemplary embodiment of the method for the luminaire system of FIG. 3.

FIG. 4 illustrates an example of a method for a luminaire system as shown in a FIG. 3. In this example it is assumed that the controller 20 can control the provision of power of the control line 15, an more in particular that the controller 20 can be put in a mode where a high impedance is seen from the control line 15 looking into the controller 20. This will typically be the case when the controller 20 is a DALI master. In such an embodiment, the controller has an internal power supply which can be switched on/off by the controller 20. In a first step 401, the driver 10 and the controller are powered on, or relevant portions thereof are powered on. However, the internal power supply of the controller for powering the control line 15 is not yet connected to the control line 15 so that the controller 20 is in a listening mode. In a second step 402 a value representative for an impedance of the driver 10 as seen from the control line 15 is measured. Here, a voltage on the control line is measured. In a third step 403, it is checked whether the measured voltage is above or below a threshold value Vt, preferably a threshold value between 5V and 10V, e.g. between 9V and 10V. If the voltage is above Vt, the 0-10V protocol is selected and the controller 20 is configured with the 0-10V protocol, see step 404 and if not, the DALI protocol is selected and the controller 20 is configured with the DALI protocol, see step 405. After step 402, the resources may be set. Also, if the DALI protocol is selected in step 405, the querying and commissioning of one or more DALI client(s) may be performed. Further, after step 402, the internal power supply may be switched on, so that the controller 20 is put in a steering mode in which it may send and/or receive signals to/from the driver 10 using the selected protocol.

This exemplary method is based on the insight that a 0-10V LED driver is typically equipped with a pull-up resistor so that it pulls the 0-10V signal to high level (being in the 10V-16V range) whenever the controller is in the listening mode, i.e. when a high impedance is seen at its control line input. A DALI driver is often a client that does not provide power on the control line 15. In such a case, the control line may be powered either from the DALI master, i.e. the controller 20, or from another DALI power supply to get the DALI bus voltage to the 16-24V range. When performing step 402, such power supply is not yet switched on, so that a voltage on the control line will be lower that the predetermined threshold Vt.

Such auto-detection routine may be applied as long as no dimming protocol is detected. Once a dimming protocol has been detected then the corresponding dimming interface mode may be directly initiated at power ON accordingly. In order to know whether or not to apply the auto-detection routine, a flag may be set in a memory of the controller 20, wherein the flag indicates whether or not a protocol has been selected. Such flag may be reset when performing a factory reset or may be reset remotely to force the auto-detection routine to be applied again. E.g. in the event that a central control system receives a problem report of the controller 20, it may determine to remotely reset the flag to force the auto-detection routine to be performed at the next power-on.

Figure 5:
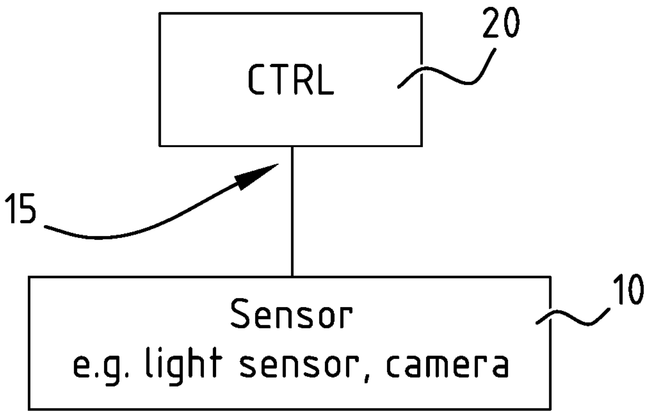
FIG. 5 illustrates a schematic view of an exemplary embodiment of a luminaire system, where the first device is a sensor and the second device is a controller.

FIG. 5 illustrates an example where the second device 20 is a controller and the first device 10 is a sensor 10. For example, the sensor 10 may be an environmental sensor such as a light sensor, a motion sensor, a pollution sensor, an image sensor such as a camera, a radar sensor, a microphone, a visibility sensor, a vibration sensor, an air flow sensor, a detector of $CO_2$, $NO_x$, smoke, etc.

For example, the sensor 10 may be a light sensor, e.g. a light sensor used in tunnels. Such sensors may communicate with the controller using an analog current loop, i.e. using e.g. a 4-20 mA protocol or using another digital or analog protocol, e.g. DALI or 0-10V. In such an embodiment, the current on the control line 15 may be measured to determine whether the protocol is a 4-20 mA protocol. For example, if the measured current is above 4 mA, it may be determined that the protocol is the 4-20 mA protocol and if the measured current is below 4 mA, it may be determined that another protocol is used. In some embodiments, a further comparison may be used to distinguish between further possible protocols. Optionally, also a voltage measurement may be performed to distinguish between further possible protocols.

In another example, the sensor 10 may be a camera. A camera may communicate e.g. via a power over Ethernet PoE protocol or through DALI. In such an embodiment, the voltage on the control line 15 may be measured to determine whether the protocol is a PoE protocol or a DALI protocol. For example, if it is assumed that the control line 15 is already powered when performing the measurement (either through an internal power supply or through an external power supply), if the measured voltage is between 16V and 24V, it may be determined that the protocol is the DALI protocol and if the measured voltage is between 42V and 56V, it may be determined that the protocol is a PoE protocol.

Figure 6A:
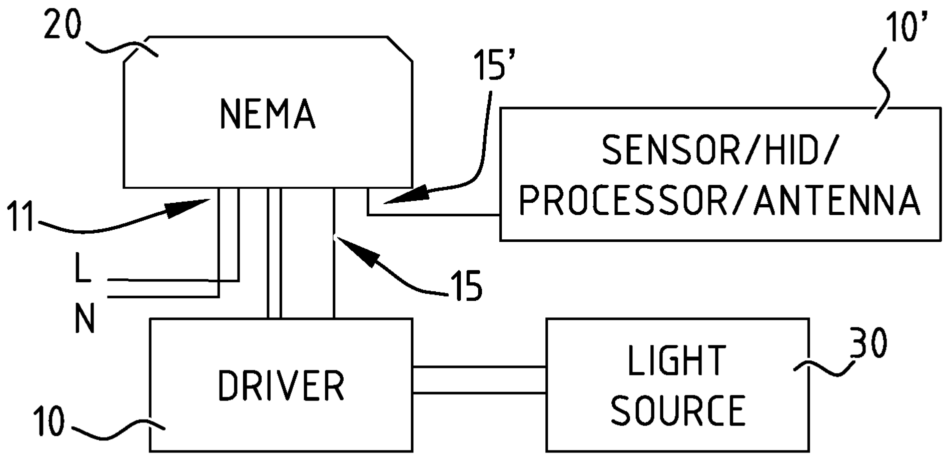
FIGS. 6A and 6B are schematic views of an exemplary embodiment of a luminaire system with a pluggable NEMA type control module and of a luminaire system with a pluggable Zhaga type control module, respectively.
Figure 6B:
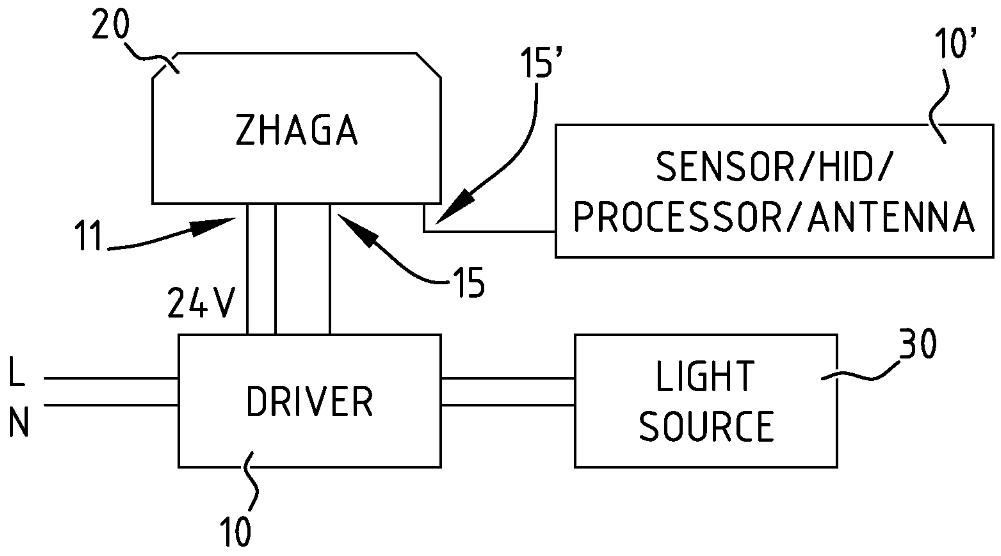

FIGS. 6A and 6B illustrate two exemplary embodiments of a luminaire system with a controller 20 being a pluggable module. The same or similar components have been indicated with the same reference numerals as in FIG. 1 and will not be described again. In the example of FIG. 6A the controller 20 is a NEMA control module and in the example of FIG. 6B the controller 20 is a Zhaga control module. The socket receptacle (not shown) in which the control module is plugged may then also be of a NEMA or a Zhaga type, respectively. Preferably, the requirements of the ANSI C136.41-2013 standard or the ANSI C136.10-2017 standard are fulfilled for the NEMA control module, and the requirements of the Zhaga standard (Book 18, Edition 1.0, July 2018, see https://www.zhagastandard.org/data/downloadables/1/0/8/1/book 18.pdf or Book 20: Smart interface between indoor luminaires and sensing/communication modules) are fulfilled for the Zhaga control module.

In the example of FIG. 6A the control module 20 receives power directly from the mains L, N. The driver 10 also receives power directly from the mains L, N. A connection interface comprises here at least two power connections 11 for receiving a power signal from the mains L, N, a control line for communicating a control dimming signal from the control module 20 to the driver 10, and another control line 15' for connecting the controller 20 to another device 10', e.g. a sensor, a HID, a processor, an antenna, etc. Such NEMA control module 20 may be configured as a DALI master and may be configured to perform the method of FIG. 4.

In the example of FIG. 6B the control module 20 receives power, e.g. a DC power signal such as 24V DC signal, from a power conversion means included in the driver 10. The driver 10 is connected to the mains L, N. The connection interface comprises here at least two power connections 11 for receiving a DC power signal from the driver 10, a control line 15 for communicating a control dimming signal from the control module 20 to the driver 10, and another control line 15' for connecting the control module 20 to another device 10', e.g. a sensor, a HID, a processor, an antenna, etc. Embodiments of the method may be used to auto-determine the protocol to be used on the control line 15 and/or on the control line 15'. For example, to auto-determine the protocol to be used on the control line 15, the method of FIG. 10 may be used, see further.

Figure 7:
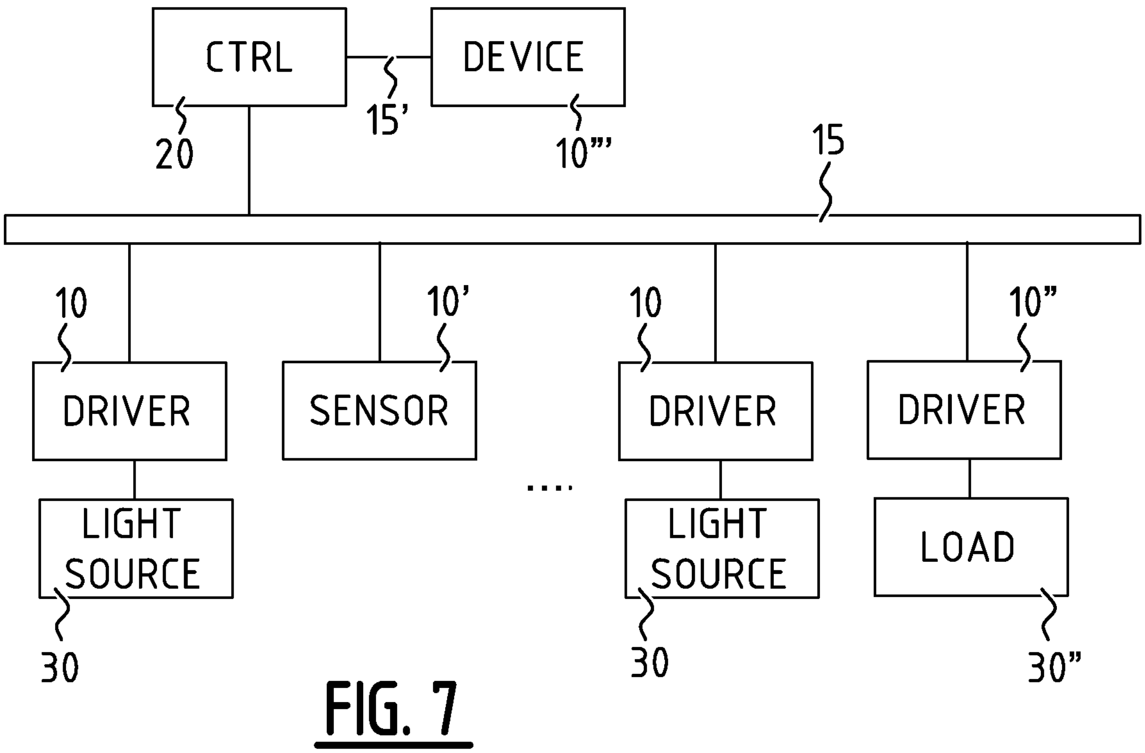
FIG. 7 is a schematic view of an exemplary embodiment of a luminaire system with a plurality of light sources and other loads connected to a DALI bus.

FIG. 7 illustrates an exemplary embodiment of a luminaire system comprising a plurality of drivers 10, 10" with associated light sources 30 or other loads 30" connected to a control line 15, here a DALI bus. Further one or more sensors or other devices 10' may be connected to the DALI bus 15. The luminaire system further comprises a controller 20 configured to control e.g. the light output of the plurality of light sources 30 through the DALI bus 15. The controller 20 is connected through a further control line 15' to another device 10". Again, embodiments of the method may be used to auto-determine the protocol to be used on the control line 15 and/or on the control line 15'.

Figure 8:
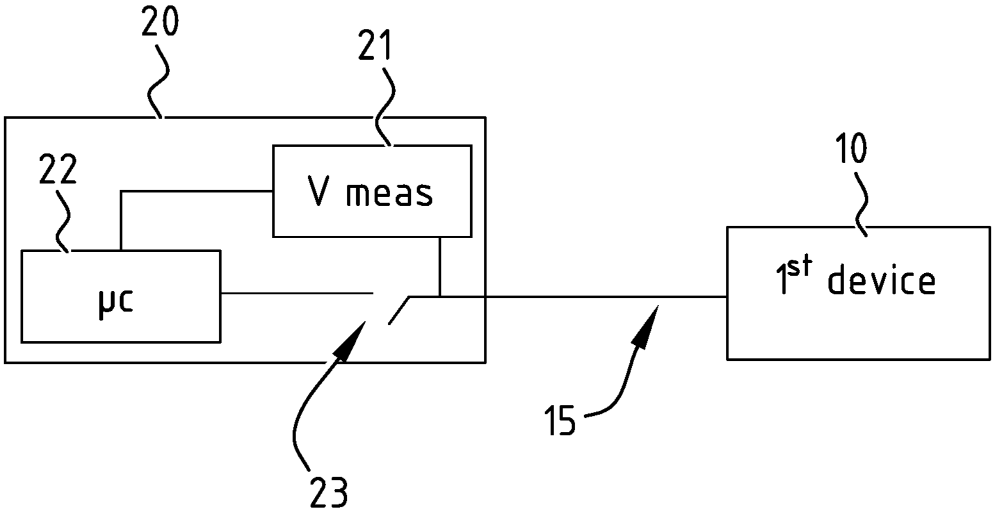
FIGS. 8 and 9 illustrate a more detailed schematic views of exemplary embodiments of a luminaire system.
Figure 9:
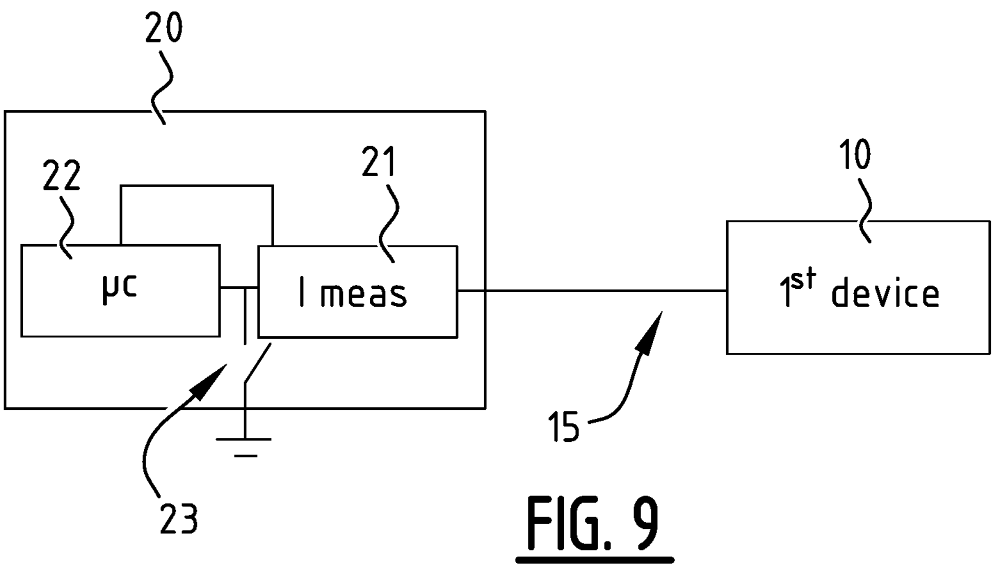

FIGS. 8 and 9 show a luminaire system comprising a first device 10, a second device 20, and a control line 15 between said first device 10 and said second device 20. The second device 20 is configurable to send and/or receive signals through the control line 15 to/from the first device 10 using any one of a plurality of different protocols. The first device 10 is configured to use one of the plurality of different protocols, and typically it can use only that one protocol and not the other protocols of the plurality of protocols. For example, the first device 10 may be only capable of using 0-10V whilst the second device 20 is capable of using either DALI or 0-10V.

In FIG. 8, the second device 20 comprises measurement circuitry 21 for measuring a voltage on the control line 15, control circuitry 22, e.g. a microcontroller, and switching circuitry 23. The switching circuitry 23 is configured to switch the second device 20 between a listening mode, here a high impedance mode with the illustrated switch open, and a steering mode, said steering mode being such that signals in accordance with the selected protocol can be sent from the second device 20 to the first device 10. The control circuitry 22 may be configured to put the second device 20 in the listening mode for performing step a) and to put the second device 20 in the steering mode after step a).

In FIG. 9, the second device 20 comprises measurement circuitry 21 for measuring a current on the control line 15, control circuitry 22, e.g. a microcontroller, and switching circuitry 23. The switching circuitry 23 is configured to switch the second device between a listening mode, here a low impedance mode with the illustrated switch closed, and a steering mode, said steering mode being such that signals in accordance with the selected protocol can be sent from the second device 20 to the first device 10. The control circuitry 22 may be configured to put the second device 20 in the listening mode for performing step a) and to put the second device 20 in the steering mode after step a).

Figure 10:
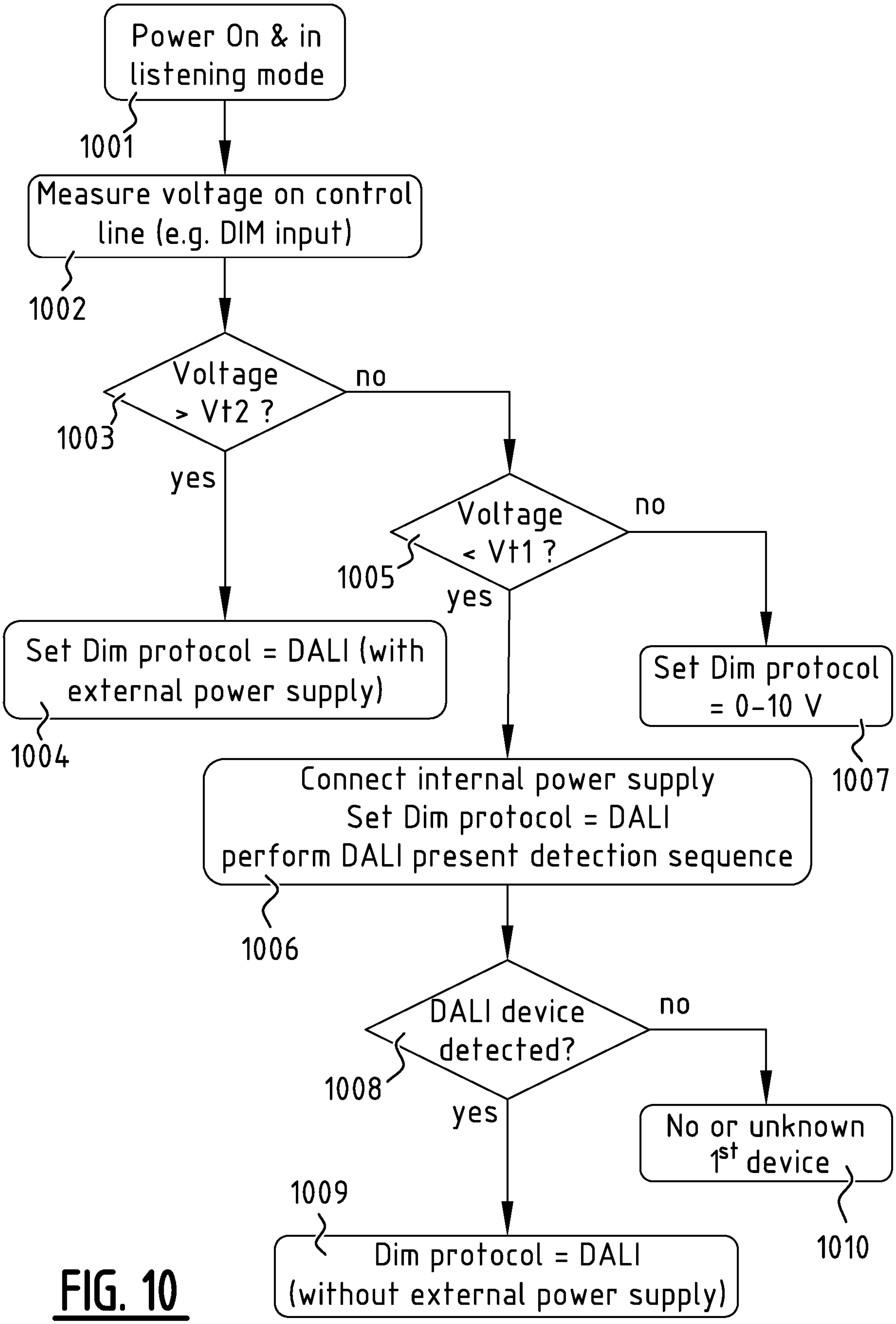
FIG. 10 is a flowchart illustrating another exemplary embodiment of the method.

FIG. 10 illustrates another example of a method for a luminaire system as shown in a FIG. 3. In a first step 1001, the driver and the controller are powered on, or relevant portions thereof are powered on and the controlled is put in a listening mode. This embodiment will be suitable both for cases where an external power supply is used to power the control line 15 as for cases where an internal power supply controlled by the controller 20 is used. Stated differently, the method may be used for cases where for a certain protocol the voltage on the control line may be different depending on whether or not the control line is powered. In a second step 1002 a value representative for an impedance of the driver as seen from the control line is measured. Here, a voltage on the control line is measured. In a third step 1003, it is checked whether the measured voltage is above or below a second threshold value Vt2, preferably between 11V and 13V, e.g. 12V. If the voltage is above the second threshold value, the DALI protocol is selected and the controller is set up to use the DALI protocol, and it is determined that the driver is connected to an external power source, see step 1004. If the voltage is below the second threshold Vt2, it is checked whether the voltage is above a first threshold value Vt1, preferably a threshold value between 5V and 10V, e.g. between 9V and 10V, see step 1005. If the voltage is above the first threshold Vt1, the 0-10V protocol is selected, and the controller is configured with the 0-10V protocol, see step 1007. If the voltage is below the first threshold, the DALI protocol is selected and an internal power source is connected to the control line. Next, a DALI present detection sequence may be performed, i.e. one or more detection signals may be transmitted on the control line. If a response to the one or more detection signals indicates that the first device is a DALI device, the DALI selection is confirmed, see step 1009. If not, it is determined that no device or an unknown first device is present, see step 1010. It is noted that, if it can be ascertained that the first device is either a 0-10V device or a DALI device (and not another unknown device), then the DALI present detection sequence and steps 1008-1010 may be omitted.

Figure 11:
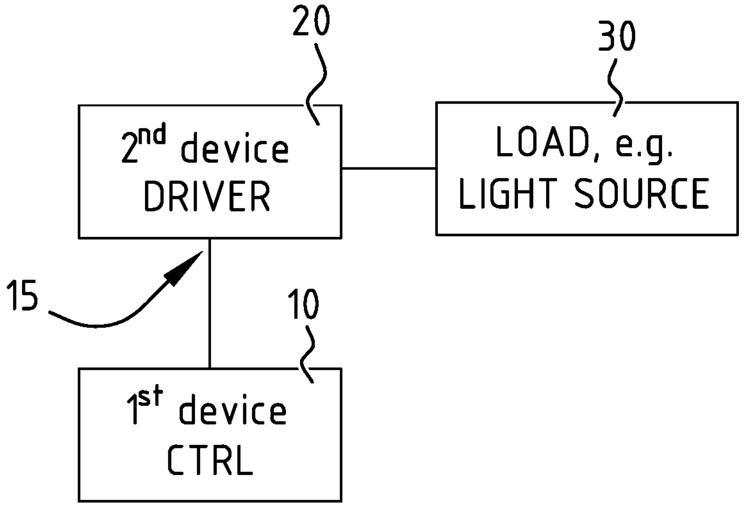
FIG. 11 is a schematic view of an exemplary embodiment of a luminaire system, where the first device is a controller and the second device is a driver.

FIG. 11 illustrates an example where the second device 20 is a driver for driving a load 30, e.g. a light source, and the first device 10 is a controller. For example, the light source may comprise a plurality of LEDs and the driver may be a LED driver. However, also other loads 30 are possible, such as a sensing means, a communication device, an output means such as a display or a loudspeaker, an input means, a dispensing means, a human-interface device.

When multiple loads 30 are present, it is also possible to have multiple control lines 15 between the driver 10 and the controller 20 for controlling the driving of the multiple loads 30. In such an embodiment the protocol to be used on one or more of said multiple control lines 15 may be determined for each of said one or more control lines.

In this exemplary embodiment it is assumed that the driver 20 is a "smart" driver capable of using multiple different protocols, e.g. a digital protocol such as DALI and an analog protocol such as 0-10V whilst the controller is capable of using only a single one of said multiple protocols. In such an embodiment it may be useful to put the controller 10 is a steering mode where it sends signals on the control line 15. By measuring variations on the control line 15 it may then be determined whether the digital protocol or the analog protocol is used. Indeed, in case of a digital protocol one will measure a difference between a value representing a "1" and a value representing a "0" whilst in case of an analog protocol different difference variations will be measured, allowing distinguishing between the two protocols.

Whilst the principles of the invention have been set out above in connection with specific embodiments, it is understood that this description is merely made by way of example and not as a limitation of the scope of protection which is determined by the appended claims.

The invention claimed is:

1. A method for configuring a luminaire system comprising a first device and a second device, and a control line between said first device and said second device, wherein said second device is configurable to send and/or receive signals through the control line to/from the first device using any one of a plurality of different protocols, and wherein said first device is configured to use one of the plurality of different protocols, the method comprising the following steps controlled by the second device:

a) determining at least one value representative for a characteristic of the first device as seen from the control line; and b) based on the at least one determined value, selecting a corresponding protocol of said plurality of protocols; and configuring the second device to use the selected corresponding protocol, wherein the second device is configured to switch between a listening mode and a steering mode, said listening mode being a mode in which the impedance of the second device as seen from the control line allows performing the determining of step a) and said steering mode being such that signals in accordance with the selected protocol can be exchanged between the second device and the first device, and wherein the second device is put in the listening mode for performing step a) and put in the steering mode after step a).

2. The method of claim 1, wherein step a) comprises measuring at least one value representative for an impedance of the first device as seen from the control line.

3. The method of claim 2, wherein the plurality of protocols comprises an analogue dimming protocol and a digital dimming protocol, and wherein the step of measuring at least one value comprises measuring a voltage on the control line; and wherein:

step b) comprises, if the measured voltage is above a predetermined second threshold, setting an analogue dimming protocol; and if the measured voltage is below a predetermined first threshold, setting a DALI dimming protocol, wherein the second threshold is higher than or equal to the first threshold; or step b) comprises any one of:

if the measured voltage is above a predetermined first threshold and below a predetermined second threshold, wherein the second threshold is higher than the first threshold, setting an analogue dimming protocol; if the measured voltage is above the second threshold or below the first threshold, setting a DALI protocol, if the measured voltage is above a predetermined first threshold and below a predetermined second threshold, wherein the second threshold is higher than the first threshold, setting an analogue dimming protocol; if the measured voltage is above the second threshold or below the first threshold, setting a DALI protocol, wherein if the measured voltage is below the first threshold, the second device connects the control line to an internal power supply so that the control line is powered.

4. The method of claim 1, wherein the determining comprises listening for an electric signal on the control line and determining at least one value for a characteristic of said electric signal.

5. The method of claim 1, wherein step a) comprises emitting a test signal according to a first protocol of said plurality of protocols, and determining a value of a response signal on the control line, and if the value is according to the first protocol, selecting the first protocol in step b), and if the response is not according to the first protocol, selecting another protocol in step b) and/or emitting a further test signal according to a second protocol of said plurality of protocols, and determining a value of a response signal on the control line.

6. The method of claim 1, wherein the second device is configured to perform the switching between the listening and the steering mode automatically, and wherein the second device is programmed to enter automatically in the listening mode when the device is powered-on and a value indicates that the protocol still has to be selected.

7. The method of claim 1, wherein the first device is a driver configured for driving a load of the luminaire system, the load being any one of a light source, a sensing means, a communication device, an output means, an input means, a dispensing means, a human-interface device, and wherein the second device is a controller configured for controlling the driver; and/or wherein the plurality of protocols comprises a plurality of different dimming protocols comprising an analogue dimming protocol and a digital dimming protocol; and/or wherein step a) comprises applying a current and measuring a voltage and/or applying a voltage and measuring a current.

8. The method of claim 1, wherein the first device is a sensor and the second device is a controller; and/or wherein the second device is a driver configured for driving a load of the luminaire system.

9. The method of claim 1, wherein the step of measuring at least one value comprises measuring a voltage on the control line and the listening mode is such that the impedance of the second device as seen from the control line is a high impedance; and/or wherein the step of measuring at least one value comprises measuring a voltage on the control line and the plurality of protocols comprises at least a first protocol associated with a first voltage range and a second protocol associated with a second voltage range, and the selecting is done by comparing the measured voltage with said first and second range.

10. The method of claim 1, wherein the step of determining at least one value comprises determining multiple values, and wherein step b) comprises determining differences between the multiple values, and performing the step of selecting based on the determined differences; and/or wherein the second device comprises measurement circuitry for performing step a); and/or wherein the method comprises, after performing step a), a step of controlling an internal power supply of the second device to power the control line; and/or wherein the plurality of protocols is a plurality of communications protocols.

11. A device of a luminaire system intended for being connected to at least an other device via a control line, wherein said device is configurable to send and/or receive signals through said control line to/from the other device using any one of a plurality of different protocols, and wherein the other device is configured to use one of the plurality of different protocols, wherein the device is configured to control the following steps:

a) determining at least one value representative for a characteristic of the other device as seen from the control line; and b) based on the measured at least one value, selecting a corresponding protocol of said plurality of protocols; and configuring the device to use the selected corresponding protocol;

wherein the device comprises switching circuitry configured to switch the device between a listening mode and a steering mode, said listening mode being a mode in which the impedance of the device as seen from the control line allows performing the determining of step a) and said steering mode being such that signals in accordance with the selected protocol can be exchanged between the device and the other device, and wherein the device is configured to put itself in the listening mode for performing step a) and to put itself in the steering mode after step a).

12. The device of claim 11, wherein the determining comprises listening for an electric signal on the control line and determining at least one value for a characteristic of said electric signal; and/or wherein step a) comprises emitting a test signal according to a first protocol of said plurality of protocols, and determining a value of a response signal on the control line, and if the value is according to the first protocol, selecting the first protocol in step b), and if the response is not according to the first protocol, selecting another protocol in step b) and/or emitting a further test signal according to a second protocol of said plurality of protocols, and determining a value of a response signal on the control line; and/or wherein the plurality of protocols is a plurality of communications protocols.

13. The device of claim 11, wherein the device is configured to perform the switching between the listening and the steering mode automatically, wherein the device is programmed to enter automatically in the listening mode when the device is powered-on when a value indicates that the protocol still has to be selected.

14. The device of claim 11, wherein the device is a controller configured for being connected through the control line to a driver and for controlling the driver; and/or wherein the plurality of protocols comprises a plurality of different dimming protocols, comprising an analogue dimming protocol and a digital dimming protocol.

15. The device of claim 11, wherein the device is a controller configured for communicating with a sensor through the control line; or wherein the device is a driver configured for driving a load of the luminaire system.

16. The device of claim 11, comprising circuitry configured for applying a current and measuring a voltage and/or for applying a voltage and measuring a current.

17. The device of claim 11, comprising circuitry configured for applying a current and measuring a voltage and/or for applying a voltage and measuring a current, wherein the circuitry is configured for measuring a voltage on the control line;

wherein the listening mode is such that the impedance of the device as seen from the control line is a high impedance.

18. The device of claim 11, comprising circuitry configured for applying a current and measuring a voltage and/or for applying a voltage and measuring a current, wherein the circuitry is configured for measuring a voltage on the control line, wherein the plurality of protocols comprises at least a first protocol associated with a first voltage range and a second protocol associated with a second voltage range, and the selecting is done by comparing the measured voltage with said first and second range.

19. The device of claim 18, wherein the plurality of protocols comprises a plurality of different dimming protocols, comprising an analogue dimming protocol and a digital dimming protocol, and wherein the device is configured for setting an analogue dimming protocol if the measured voltage is above a predetermined second threshold; and for setting a DALI dimming protocol if the measured voltage is below a predetermined first threshold, wherein the second threshold is higher than or equal to the first threshold;

wherein step b) comprises, if the measured voltage is above a predetermined first threshold and below a predetermined second threshold, wherein the second threshold is higher than the first threshold, setting an analogue dimming protocol; if the measured voltage is above the second threshold or below the first threshold, setting a DALI protocol, wherein optionally, if the measured voltage is below the first threshold, the second device connects the control line to an internal power supply so that the control line is powered.

20. A device of a luminaire system intended for being connected to at least an other device via a control line, wherein said device is configurable to send and/or receive signals through said control line to/from the other device using any one of a plurality of different protocols, wherein the other device is configured to use one of the plurality of different protocols, and wherein the device is configured to control the following steps:

a) determining at least one value representative for a characteristic of the other device as seen from the control line; and b) based on the measured at least one value, selecting a corresponding protocol of said plurality of protocols; and configuring the device to use the selected corresponding protocol, wherein the device is a controller configured for communicating with a sensor through the control line.

* * * * *